(12) United States Patent
Zhou et al.

(10) Patent No.: US 9,843,511 B2
(45) Date of Patent: Dec. 12, 2017

(54) METHOD AND APPARATUS FOR SELECTING PATH FROM PATHS BETWEEN LABEL EDGE ROUTERS

(71) Applicant: Telefonaktiebolaget L M Ericsson (publ), Stockholm (SE)

(72) Inventors: Yaping Zhou, Beijing (CN); Cuihua Deng, Beijing (CN)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 40 days.

(21) Appl. No.: 14/907,328

(22) PCT Filed: Jul. 31, 2013

(86) PCT No.: PCT/CN2013/080475
§ 371 (c)(1),
(2) Date: Jan. 25, 2016

(87) PCT Pub. No.: WO2015/013905
PCT Pub. Date: Feb. 5, 2015

(65) Prior Publication Data
US 2016/0173372 A1      Jun. 16, 2016

(51) Int. Cl.
*H04L 12/721* (2013.01)
*H04L 12/64* (2006.01)
(Continued)

(52) U.S. Cl.
CPC .......... *H04L 45/70* (2013.01); *H04L 12/6418* (2013.01); *H04L 45/22* (2013.01); *H04L 45/28* (2013.01); *H04L 45/50* (2013.01)

(58) Field of Classification Search
None
See application file for complete search history.

(56) References Cited

U.S. PATENT DOCUMENTS 6,963,575 B1 * 11/2005 Sistanizadeh ....... H04L 12/4625
370/401
7,443,832 B2 * 10/2008 Randriamasy .......... H04L 45/12
370/351
(Continued)

FOREIGN PATENT DOCUMENTS

CN          101610214 A      12/2009
EP            2541837 A2       1/2013

OTHER PUBLICATIONS

International Preliminary Report on Patentability for International Patent Application No. PCT/CN2013/080475, dated Feb. 11, 2016, 6 pages.
(Continued)

*Primary Examiner* — Hong Cho
(74) *Attorney, Agent, or Firm* — Withrow & Terranova, PLLC

(57) ABSTRACT

The embodiments disclose a method and apparatus of selecting a path for transmission from paths between a first LER and a second LER in the MPLS network. The method may comprise: obtaining state information of the paths between the first LER and the second LER, the state information may indicate that a path is in up state or down state; obtaining stability information of at least one of the paths between the first LER and the second LER, the stability information may indicate that a path is stable or unstable; and selecting a path for transmission based on the state information and the stability information.

11 Claims, 2 Drawing Sheets obtaining state information of the paths between the first LER and the second LER 210 obtaining stability information of at least one of the paths between the first LER and the second LER 220 selecting a path for transmission based on the state information and the stability information 230

(51) Int. Cl.
*H04L 12/707* (2013.01)
*H04L 12/703* (2013.01)
*H04L 12/723* (2013.01)

(56) References Cited

U.S. PATENT DOCUMENTS

| | | | |
|---|---|---|---|
| 8,724,456 B1 * | 5/2014 | Hong | G06F 11/00 370/225 |
| 2006/0067217 A1 | 3/2006 | Li et al. | |
| 2009/0034975 A1 * | 2/2009 | Sadananda | H04J 14/0295 398/79 |
| 2009/0214199 A1 * | 8/2009 | Fukai | H04L 45/02 398/7 |
| 2011/0238843 A1 * | 9/2011 | Pan | H04L 45/22 709/227 |
| 2013/0235718 A1 * | 9/2013 | Wu | H04L 41/0663 370/225 |

OTHER PUBLICATIONS

Weingarten, Yaacov, et al., "MPLS Transport Profile (MPLS-TP) Linear Protection," Internet Standards Track, Request for Comments 6378, ISSN 2070-1721, Oct. 2011, Internet Engineering Task Force (IETF), pp. 1-45.

International Search Report and Written Opinion for International Patent Application No. PCT/CN2013/080475, dated Mar. 20, 2014, 10 pages.

* cited by examiner

METHOD AND APPARATUS FOR SELECTING PATH FROM PATHS BETWEEN LABEL EDGE ROUTERS

This application is a 35 U.S.C. §371 national phase filing of International Application No. PCT/CN2013/080475, filed Jul. 31, 2013, the disclosure of which is incorporated herein by reference in its entirety.

TECHNICAL FIELD

The present technology relates to the field of communication, particularly to a method of selecting a path for transmission from paths between label edge routers (LERs) in the multi-protocol label switch (MPLS) network. The technology also relates to an apparatus and a computer readable storage medium for performing the method.

BACKGROUND

MPLS is a mechanism in high-performance telecommunications networks that directs data from one network node to the next based on short path labels rather than long network addresses. In an MPLS network, data packets are assigned labels. Packet-forwarding decisions are made solely on the contents of this label. This allows one to create end-to-end virtual circuits across any type of transport medium, using any protocol.

In MPLS network, routers that perform routing based only on the label are called label switch routers (LSRs). The entry and exit points of an MPLS network are called label edge routers (LERs). Labels are distributed between LERs and LSRs manually or by using the label signaling mechanisms, such as Label Distribution Protocol (LDP) and Resource Reservation Protocol-Traffic Engineering (RSVP-TE).

Generally, there are two traffic paths between two LERs, a working path (or working Label Switched Path (LSP)) and a protection path (or protection LSP), as illustrated in FIG. 1. In normal state, the Protection Switching Control (PSC) unit of both LERs controls the working path to transmit data therebetween. If there is a failure on the working path, then LER 110 and LER 120 will switch the traffic from the working path to the protection path and enter protecting failure state for the reason of signal failure (SF) on the working path. Once "SF clear" event on working path occurs, a wait-to-restore (WTR) timer is trigged. At this point, the LER 110 and LER 120 enter WTR state. If there is no SF on the working path, no admin intervention and no SF on the protection path, the WTR will expire (e.g. after 5 minutes) naturally, and the LERs will switch the traffic back to working path and enter normal state. And, if there is SF on the working path within the duration (WTR), LERs will terminate WTR and enter protecting failure state again. If there is SF on the protection path within the duration (WTR), LER will terminate WTR and enter unavailable state with traffic be switched back to working path immediately. Hence, a flap from normal (i.e. up state) to failure (i.e. down state) then back to normal on working path happens after WTR expire naturally, then a next cycle starts.

The disadvantage of the solution is that, if working path or both the working path and the protection path keeps flapping, the PSC will be busy on signaling and message handling, and in a scaled protection network, the frequent flapping may cause the LERs to be ramshackle. In addition, the working path and the protection path usually have different delay time and loss rate. If the traffic sways between the working path and the protection path frequently, some kind of services requiring stable service quality can not tolerate it.

SUMMARY

An aspect of an invention disclosed herein is a method of selecting a path for transmission from paths between a first LER and a second LER in the MPLS network. The method may comprise: obtaining state information of the paths between the first LER and the second LER, the state information may indicate that a path is in up state or down state; obtaining stability information of at least one of the paths between the first LER and the second LER, the stability information may indicate that a path is stable or unstable; and selecting a path for transmission based on the state information and the stability information.

Another aspect of the invention is an apparatus configured to select a path for transmission from paths between a first LER and a second LER in the MPLS network. The apparatus may comprise a first obtaining unit, a second obtaining unit and a selecting unit. The first obtaining unit is adapted to obtain state information of the paths between the first LER and the second LER, the state information may indicate that a path is in up state or down state; The second obtaining unit is adapted to obtain stability information of at least one of the paths between the first LER and the second LER, the stability information may indicate that a path is stable or unstable; The selecting unit is adapted to select a path for transmission based on the state information and the stability information.

A further aspect of the invention is a computer readable storage medium storing the instructions which, when running on an apparatus, cause the apparatus to perform the steps of the method as described above.

Still a further aspect of the invention is an apparatus for selecting a path for transmission from paths between a first LER and a second LER in the MPLS network. The apparatus may comprise a processor and a memory, the memory contains instructions executable by the processor whereby the apparatus is operative to obtain state information of the paths between the first LER and the second LER, the state information may indicate that a path is in up state or down state; obtain stability information of at least one of the paths between the first LER and the second LER, the stability information may indicate that a path is stable or unstable; and select a path for transmission based on the state information and the stability information.

By taking the stability into account, and selecting the path for transmission based on the state and the stability of the path, the undesirable switches, too much PSC state transition and messages exchange/handling can be reduced. As a result, the processing resources such as signaling overhead are saved and the stable service quality is guaranteed.

BRIEF DESCRIPTION OF THE DRAWINGS

The technology will now be described, by way of example, based on embodiments with reference to the accompanying drawings, wherein.

DETAILED DESCRIPTION

Figure 1:
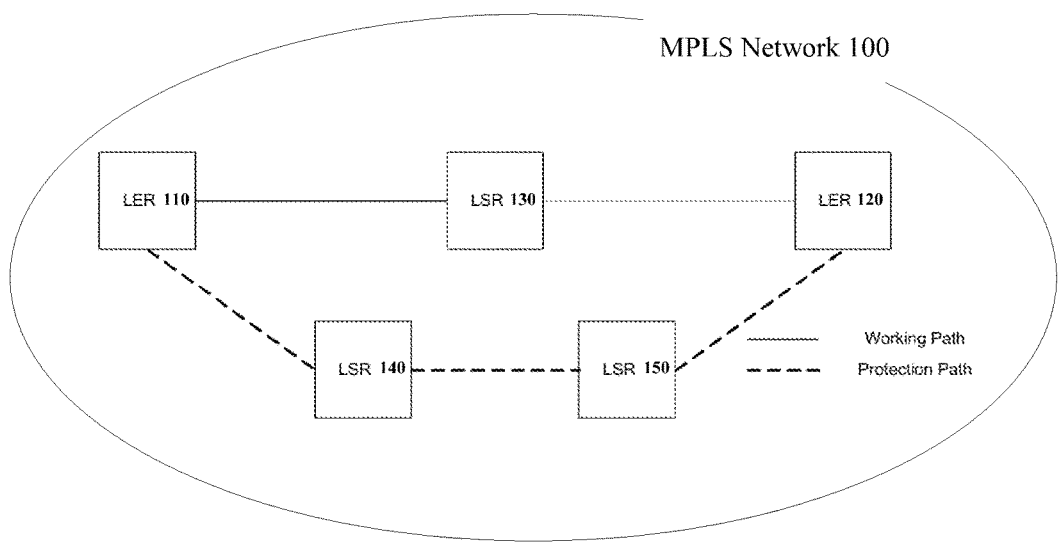
FIG. 1 illustrates a schematic view of a MPLS network environment suitable for implementing an embodiment.

Embodiments herein will be described more fully hereinafter with reference to the accompanying drawings. The embodiments herein may, however, be embodied in many different forms and should not be construed as limiting the scope of the appended claims. The elements of the drawings are not necessarily to scale relative to each other. Like numbers refer to like elements throughout.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Also, use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Unless otherwise defined, all terms (including technical and scientific terms) used herein have the same meaning as commonly understood. It will be further understood that terms used herein should be interpreted as having a meaning that is consistent with their meaning in the context of this specification and the relevant art and will not be interpreted in an idealized or overly formal sense unless expressly so defined herein.

The present technology is described below with reference to block diagrams and/or flowchart illustrations of methods, apparatus (systems) and/or computer program according to the present embodiments. It is understood that blocks of the block diagrams and/or flowchart illustrations, and combinations of blocks in the block diagrams and/or flowchart illustrations, may be implemented by computer program instructions. These computer program instructions may be provided to a processor, controller or controlling unit of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

Accordingly, the present technology may be embodied in hardware and/or in software (including firmware, resident software, micro-code, etc.). Furthermore, the present technology may take the form of a computer program on a computer-usable or computer-readable storage medium having computer-usable or computer-readable program code embodied in the medium for use by or in connection with an instruction execution system. In the context of this document, a computer-usable or computer-readable storage medium may be any medium that may contain, store, or is adapted to communicate the program for use by or in connection with the instruction execution system, apparatus, or device.

Embodiments herein will be described below with reference to the drawings.

FIG. 1 illustrates a schematic view of a MPLS network environment suitable for implementing an embodiment.

The MPLS network 100 may comprise LER 110 and LER 120. There are two paths between the LER 110 and the LER 120, the working path and the protection path. The working path is established via LSR 130, and the protection path is established via the LSR 140 and LSR 150.

Here, the MPLS network 100 may refer to static MPLS, MPLS Transport Profile (MPLS-TP), and the like. For simplicity and clarity, only two LERs and three LSRs are shown in the MPLS network 100, but it should be appreciated that more LERs and LSRs may exist in the MPLS network and there may be one or more paths between a pair of LERs.

Figure 2:
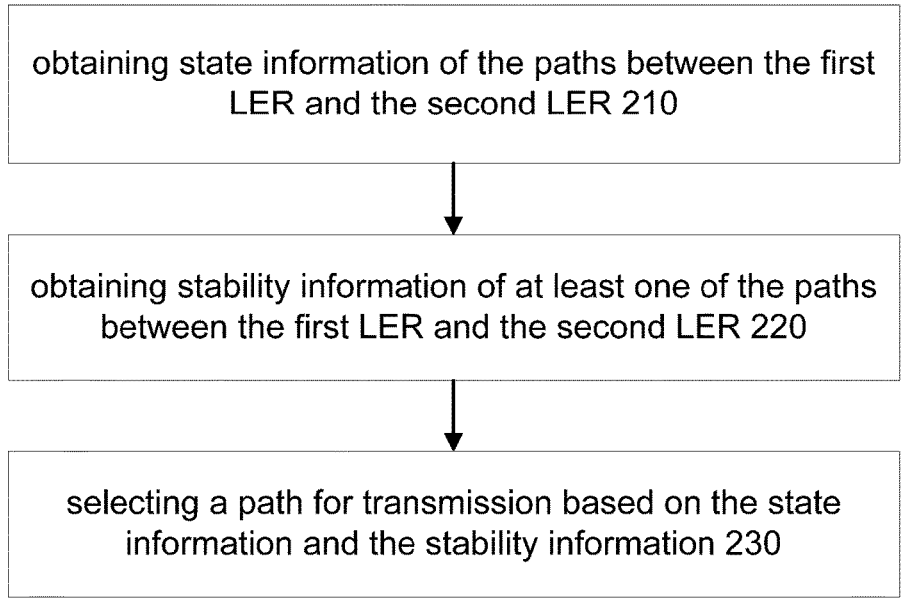
FIG. 2 schematically illustrates a flowchart of selecting a path for transmission from paths between LERs in the MPLS network in accordance with an embodiment.

FIG. 2 schematically illustrates a flowchart of selecting a path for transmission from paths between LERs, e.g. LER 110 and LER 120, in the MPLS network, e.g. MPLS network 100, in accordance with an embodiment. For purpose of simplicity, the embodiment is described to be performed by LER 110, it should be noted that the embodiment can also be performed by the LER 120 or other management nodes that communicate with the LERs.

Now the process of the embodiment will be described in detail with reference to the FIG. 1 and FIG. 2.

In step 210, the LER 110 may obtain state information of the paths between the LER 110 and the LER 120. The state information may indicate that a path is in up state or down state. Here, the state information can be obtained by listening to the state related events, such as "signal fail", "clear signal fail" and "clear", which may come from the server indication, control-plane indication, operation administration and maintenance (OAM) indication or operator command. Since the above ways to obtain the state information of the paths is known in the art, they will not be described in more detail for conciseness.

In step 220, the LER 110 may obtain stability information of at least one of the paths between the LER 110 and the LER 120. The stability information may indicate that a path is stable or unstable. For example, the LER 110 may just obtain the stability information of one of the paths, such as the working path, or of both the working path and the protection path as desired.

The stability information can be obtained based on flap information, which may indicates back-and-forth state switching of a path between up state and down state. One flap can be defined as one occurrence of state change of a path from up state to down state, and then to up state again. As indicated, the flap information can be determined by continuously monitoring the state changes of the path.

Specifically, a path penalty parameter is introduced to be associated with the flap. The path penalty value will increase with the increasing of the count of flaps, and decrease over time if there is no new flap.

For example, when receiving a first flap occurring on the working path between the LER 110 and LER 120, the LER 110 may initialize the path penalty parameter corresponding to the working path with an initial value above a suppression threshold. The suppression threshold can be used to indicate the dividing line between stable and unstable. It can be regulated that the path is stable when the path penalty value is lower than the suppression threshold and unstable when the path penalty value is above the suppression threshold. As seen, when the first flap is received, the corresponding path is set to be unstable.

With the incoming of new flap, the path penalty value can be, for example, recalculated as below:

$$f(x)=x+1000\times 2^{n-1} \quad (1)$$

Where x is the original path penalty and n is the flapping count observed.

In addition, a decay time is defined to trigger the re-calculation of the path penalty value if there is no new flap over the decay time period. If the decay time expires, the path penalty can be, for example, exponentially decayed as below:

$$f(x)=x\times[1-(\tfrac{1}{2})^{t/T}] \quad (2)$$

where x is the original path penalty, t is the decay time, and T is a half decay life indicating the speed of exponential decay.

In combination, if a flap happens during the decay time period, the decay timer is stopped, and the path penalty value should be updated as below:

$$f(x)=x\times[1-(\tfrac{1}{2})^{(t1-t0)/T}]+1000\times 2^{n-1} \quad (3)$$

where t1 is the current system time and t0 is the system time when the decay timer is triggered.

Subsequently, the LER 110 may determine the stability of the path based on the corresponding path penalty value. If the path penalty value is below the suppression threshold, then the corresponding path is determined to be stable, otherwise unstable. Additionally or alternatively, the LER 110 may directly determine the working path to be stable if there is no state switching between the up state and the down state on the working path within a long enough time period referred to as the maximum suppression time. The stability determination can be performed periodically or triggered by specific events. Moreover, when determining that the path is stable, the LER 110 may invalidate the corresponding path penalty and flapping count, for example setting to zero.

It should be appreciated that the above path penalty calculation formulas are simply described as example, which can be redefined or modified as appropriate. It also should be appreciated that the above stability information acquirement simply are described by way of example, and other suitable ways to obtain the stability information can be applied to the present invention.

In step 230, the LER 110 may select a path for transmission from the working path and the protection path based on the state information obtained in step 210 and the stability information obtained in step 220.

Specifically, the LER 110 may select the path with higher priority with respect to the state and stability. The priority from high to low is up state plus stable, up state plus unstable, and down state (Note that the stability information of the path is not available when the path is in down state). For example, if the protection path is in up stable but unstable and the working path is in down state, then the LER 110 should select the protection path to transmit data between the LER 110 and the LER 120, albeit the protection path is unstable.

Additionally or alternatively, when both the protection path and the working path between the LER 110 and LER 120 are in up state and unstable, the working path is preferred to transmit data, or alternatively, the path with the lower path penalty value can be selected for data transmission.

For simplicity, all the steps of the embodiment are performed by the same LER, but it should be noted that these steps can be performed in separate apparatus as desired. For example, the steps of obtaining the state information and obtaining the stability information may be performed in one LER, e.g. LER 120, while the step of selecting a path for transmission is performed in another LER, e.g. LER 110.

By taking the stability into account, and selecting the path for transmission based on the state and the stability of the path, the undesirable switches, too much PSC state transition and messages exchange/handling can be reduced. As a result, the processing resources such as signaling overhead are saved and the stable service quality is guaranteed.

Furthermore, since two LERs often are indirectly connected via one or more LSRs, there is a delay of information synchronization between the two LERs, therefore it is possible that the two LERs may hold different state information or stability information with respect to the same path between them. For example, as illustrated in FIG. 1, at some time point, the LER 110 is notified of a signal failure from the LSR 140 directly connecting with it on the protection path, while the LER 120 still has no idea of that. In this case, the LER 110 will determine the protection path to be in down state, but the LER 120 takes it as in up state.

As such, in order to obtain the state information and the stability information in more accurate way, it's preferable to combine the state information and the stability information of a particular path respectively obtained from the two LERs at the end points of this path.

In an embodiment, the LER 110 and the LER 120 may respectively obtain the state information and the stability information with respect to the paths between them, i.e. the working path and the protection path, by performing the obtaining procedures mentioned above. Subsequently, the LER 120 may transmit the state information and the stability information obtained by itself to the LER 110. As such, the LER 110 can determine the resulting state information based on the respectively obtained local and remote state information with respect to the working path, and determine the resulting stability information based on the respectively obtained local and remote stability information with respect to the working path. For example, the LER 110 may select the obtained state information in worse situation as the resulting state information of the working path, and the obtained stability information in worse situation as the resulting stability information of the working path. In the same way, the LER 110 can further determine the resulting state information and the resulting stability information of the protection path. Finally, the LER 110 may select the path for transmission from the working path and the protection path based on the resulting state information and the resulting stability information.

Notably, it's not necessarily required that both LERs need to obtain both the state information and the stability information with respect to a path. For example, it's possible that the LER 110 may obtain the state information and the stability information of the working path, while the LER 120 may just obtain the state information of the working path. Furthermore, for the protection path, it's also possible that both the LER 110 and the LER 120 may merely obtain the state information and ignore the stability information.

As can be seen, by considering the state information and the stability information of a path respectively obtained by the two LERs at the end points of the path, the resulting state information and the resulting stability information of the path can be determined more accurately, thereby contributing to the reasonable path selection for data transmission.

Optionally, it is practically undesirable that, the path penalty value keep increasing such that it will take a long time to decrease the path penalty value to be below suppression threshold even if there is no flapping during that. Therefore, when the path penalty value increases to a value above a maximum value, the path penalty value will be set as the maximum value. For example, the maximum value can be defined as below:

$$\text{Maximum value}=1000\times 2^N \quad (3)$$

where N is the predefined maximum flapping count. In an embodiment, by taking into account the maximum value, the equation for calculating the path penalty value will be formulated based on the above equations (3) and (4) as below:

$$f(x)=\min\{1000\times 2^N, x\times [1-(\tfrac{1}{2})^{(t1-t0)/T}]+1000\times 2^{n-1}\},$$
$$n=\min\{n+1,N\} \quad (5)$$

Figure 3:
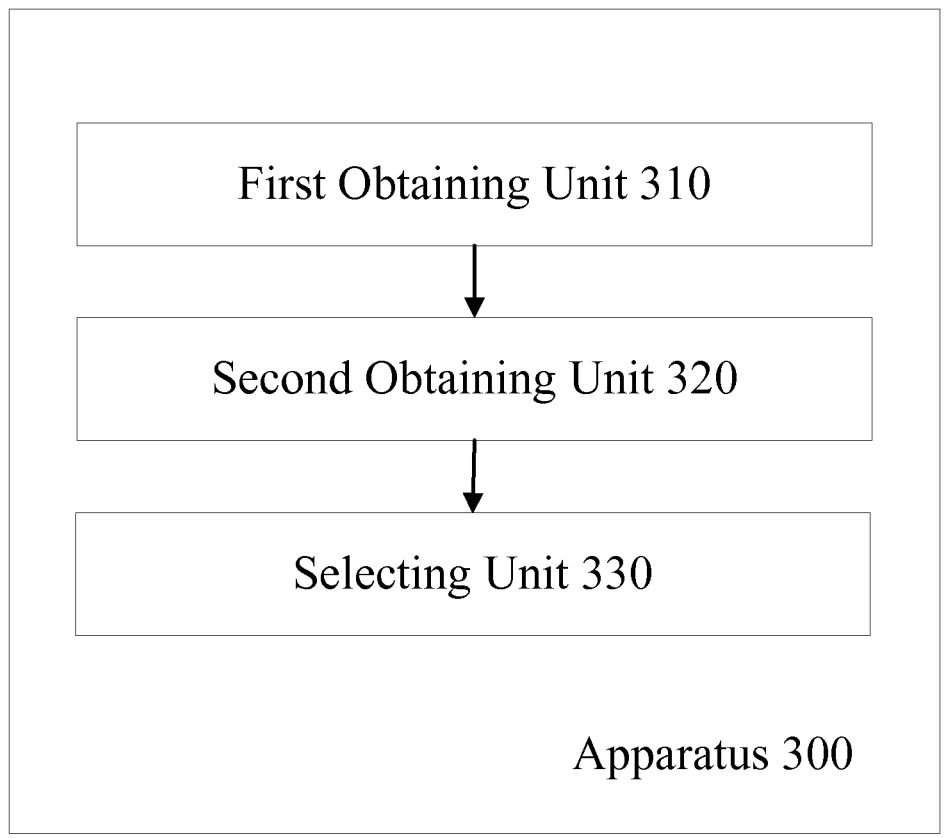
FIG. 3 is a block diagram of an exemplifying apparatus configured to select a path for transmission from paths between LERs in the MPLS network in accordance with an embodiment.

FIG. 3 is a block diagram of an exemplifying apparatus configured to select a path for transmission from paths between LERs in the MPLS network in accordance with an embodiment. As illustrated in FIG. 3, the apparatus 300 may comprise a first obtaining unit 310, a second obtaining unit 320 and a selecting unit 330. The apparatus may be implemented as an independent management node, or be integrated within the LER, such as LER 110 or 120. It should be appreciated that the apparatus is not limited to the shown elements, and can comprise other conventional elements and the additional elements for other purposes. Now the functions of the individual units will be described in detail with reference to the FIG. 1 and FIG. 3.

The first obtaining unit 310 may obtain state information of the paths between the LER 110 and the LER 120. The state information may indicate that a path is in up state or down state. Here, the state information can be obtained by listening to the state related events, such as "signal fail", "clear signal fail" and "clear", which may come from the server indication, control-plane indication, operation administration and maintenance (OAM) indication or operator command. Since the above ways to obtain the state information of the paths is known in the art, they will not be described in more detail for conciseness.

The second obtaining unit 320 may obtain stability information of at least one of the paths between the LER 110 and the LER 120. The stability information may indicate that a path is stable or unstable. For example, the LER 110 may just obtain the stability information of one of the paths, such as the working path, or of both the working path and the protection path as desired.

The stability information can be obtained based on flap information, which may indicates back-and-forth state switching of a path between up state and down state. One flap can be defined as one occurrence of state change of a path from up state to down state, and then to up state again. As indicated, the flap information can be determined by continuously monitoring the state changes of the path.

Specifically, a path penalty parameter is introduced to be associated with the flap. The path penalty value will increase with the increasing of the count of flaps, and decrease over time if there is no new flap.

For example, when receiving a first flap occurring on the working path between the LER 110 and LER 120, the second obtaining unit 320 may initialize the path penalty parameter corresponding to the working path with an initial value above a suppression threshold. The suppression threshold can be used to indicate the dividing line between stable and unstable. It can be regulated that the path is stable when the path penalty value is lower than the suppression threshold and unstable when the path penalty value is above the suppression threshold. As seen, when the first flap is received, the corresponding path is set to be unstable.

With the incoming of new flap, the path penalty value can be, for example, recalculated as below:

$$f(x)=x+1000\times 2^{n-1} \quad (1)$$

Where x is the original path penalty, and n is the flapping count observed.

In addition, a decay time is defined to trigger the recalculation of the path penalty value if there is no new flap over the decay time period. If the decay time expires, the path penalty can be, for example, exponentially decayed as below:

$$f(x)=x\times [1-(\tfrac{1}{2})^{t/T}] \quad (2)$$

where x is the original path penalty, t is the decay time, and T is a half decay life indicating the speed of exponential decay.

In combination, if a flap happens during the decay time period, the decay timer is stopped, and the path penalty value should be updated as below:

$$f(x)=x\times [1-(\tfrac{1}{2})^{(t1-t0)/T}]+1000\times 2^{n-1} \quad (3)$$

where t1 is the current system time and t0 is the system time when the decay timer is triggered.

Subsequently, the second obtaining unit 320 may determine the stability of the path based on the corresponding path penalty value. If the path penalty value is below the suppression threshold, then the corresponding path is determined to be stable, otherwise unstable. Additionally or alternatively, the second obtaining unit 320 may directly determine the working path to be stable if there is no state switching between the up state and the down state on the working path within a long enough time period referred to as the maximum suppression time. Here, the second obtaining unit 320 may perform the stability determination periodically or by triggered events. Moreover, when determining that the path is stable, the second obtaining unit 320 may invalidate the corresponding path penalty and flapping count, for example setting to zero.

It should be appreciated that the above path penalty calculation formulas are simply described as example, which can be redefined or modified as appropriate. It also should be appreciated that the above stability information acquirement simply are described by way of example, and other suitable ways to obtain the stability information can be applied to the present invention.

The selecting unit 330 may select a path for transmission from the working path and the protection path based on the state information obtained by the first obtaining unit 310 and the stability information obtained by the second obtaining unit 320.

Specifically, the selecting unit 330 may select the path with higher priority with respect to the state and stability. The priority from high to low is up state plus stable, up state plus unstable, and down state (Note that the stability information of the path is not available when the path is in down state). For example, if the protection path is in up stable but unstable and the working path is in down state, then the selecting unit 330 should select the protection path to transmit data between the LER 110 and the LER 120, albeit the protection path is unstable.

Additionally or alternatively, when both the protection path and the working path between the LER 110 and LER 120 are in up state and unstable, the selecting unit 330 may prefer the working path to transmit data, or alternatively, the selecting unit 330 may select the path with the lower path penalty value for data transmission.

For simplicity, the first obtaining unit 310, the second obtaining unit 320 and the selecting unit 330 are implemented in the same apparatus 300, but it should be noted that these units can be implemented in separate apparatus as desired. For example, the first obtaining unit and the second obtaining unit may be implemented in one LER, e.g. LER 120, while the selecting unit is implemented in another LER, e.g. LER 110.

By taking the stability into account, and selecting the path for transmission based on the state and the stability of the path, the undesirable switches, too much PSC state transition and messages exchange/handling can be reduced. As a result, the processing resources such as signaling overhead are saved and the stable service quality is guaranteed.

Optionally, it is practically undesirable that, the path penalty value keep increasing such that it will take a long time to decrease the path penalty value to be below suppression threshold even if there is no flapping during that. Therefore, when the path penalty value increases to a value above a maximum value, the path penalty value will be set as the maximum value. For example, the maximum value can be defined as below:

$$\text{Maximum value} = 1000 \times 2^N \quad (4)$$

where N is the predefined maximum flapping count. In an embodiment, by taking into account the maximum value, the equation for calculating the path penalty value will be formulated based on the above equations (3) and (4) as below:

$$f(x) = \min\{1000 \times 2^N, x \times [1-(1/2)^{(t1-t0)/T}] + 1000 \times 2^{n-1}\},$$
$$n = \min\{n+1, N\} \quad (5)$$

While the embodiments have been illustrated and described herein, it will be understood by those skilled in the art that various changes and modifications may be made, any equivalents may be substituted for elements thereof without departing from the true scope of the present technology. In addition, many modifications may be made to adapt to a particular situation and the teaching herein without departing from its central scope. Therefore it is intended that the present embodiments not be limited to the particular embodiment disclosed as the best mode contemplated for carrying out the present technology, but that the present embodiments include all embodiments falling within the scope of the appended claims.

The invention claimed is:

1. A method for selecting a path for transmission from paths between a first label edge router, LER, and a second LER in a multi-protocol label switch, MPLS, network, comprising:
   obtaining state information of the paths between the first LER and the second LER, the state information indicating a path is in an up state or a down state;
   obtaining stability information of at least one of the paths between the first LER and the second LER, the stability information indicating a path is stable or unstable where the stability information is obtained based on flap information where one flap indicates one occurrence of a state change of a path from the up state to the down state and then again to the up state and a path penalty value is set to be associated with a flap, wherein the path penalty value will increase with an increasing count of flaps and decrease over time if there is no new flap, wherein obtaining the stability information based on the flap information comprises:
      determining a path is stable if the path penalty value is below a determined threshold; and
      determining a path is unstable if the path penalty value is above the determined threshold; and
   selecting the path for transmission based on the state information and the stability information.

2. The method of claim 1, wherein the paths between the first LER and the second LER comprise a working path and a protection path, said selecting the path for transmission comprises:
   selecting the path with higher priority with respect to the state and stability, wherein the priority from high to low is up state plus stable, up state plus unstable, and down state; or
   selecting the working path when both the protection path and the working path are in up state and unstable.

3. The method of claim 1, comprising:
   obtaining the state information and the stability information of the paths respectively from the first LER and the second LER;
   for a path, determining resulting state information based on the respectively obtained state information with respect to the path, and determining resulting stability information based on the respectively obtained stability information with respect to the path; and
   selecting the path for transmission based on the resulting state information and the resulting stability information.

4. The method of claim 1, wherein when the path penalty value increases to a value above a maximum value, the path penalty value is set as the maximum value.

5. The method of claim 1, wherein the stability information is obtained based on the flap information comprises: if there is no new flap within a predetermined time period, the path is determined as stable.

6. The method of claim 1, wherein the flap information is obtained from a server indication, a control-plane indication, or an operation administration and maintenance, OAM, indication.

7. An apparatus configured to select a path for transmission from paths between a first label edge router, LER, and a second LER in a multi-protocol label switch, MPLS, network, comprising:
   a first obtaining unit adapted to obtain state information of the paths between the first LER and the second LER, the state information indicating a path is in an up state or a down state;
   a second obtaining unit adapted to obtain stability information of at least one of the paths between the first LER and the second LER, the stability information indicating a path is stable or unstable wherein the second obtaining unit is adapted to:
      obtain the stability information based on flap information where one flap indicates one occurrence of a state change of a path from the up state to the down state and then again to the up state and a path penalty value is set to be associated with a flap where the path penalty value will increase with an increasing count of flaps and decrease over time if there is no new flap;
      if the path penalty value is below a determined threshold, determine the path to be stable; and
      if the path penalty value is above the determined threshold, determine the path to be unstable;

a selecting unit adapted to select the path for transmission based on the state information and the stability information.

8. The apparatus of claim 7, wherein
the paths between the first LER and the second LER comprise a working path and a protection path, and the selecting unit is adapted to select the path with higher priority with respect to the state and stability, wherein the priority from high to low is up state plus stable, up state plus unstable, and down state, or select the working path when both the protection path and the working path are in up state and unstable.

9. The apparatus of claim 7, wherein the apparatus is the first LER or the second LER.

10. The apparatus of claim 7, wherein the second obtaining unit is further adapted to, if there is no new flap within a predetermined time period, determine the path to be stable.

11. An apparatus for selecting a path for transmission from paths between a first label edge router, LER, and a second LER in a multi-protocol label switch, MPLS, network, the apparatus comprising:
a processor; and
memory associated with the processor, said memory containing instructions executable by said processor whereby said processor is configured to:
obtain state information of the paths between the first LER and the second LER, the state information indicating a path is in an up state or a down state;
obtain stability information of at least one of the paths between the first LER and the second LER, the stability information indicating a path is stable or unstable, the stability information being obtained based on flap information where one flap indicates one occurrence of a state change of a path from the up state to the down state and then again to the up state and a path penalty value is set to be associated with a flap, wherein the path penalty value will increase with an increasing count of flaps and decrease over time if there is no new flap, wherein, when obtaining the stability information based on the flap information, the processor is further configured to:
determine a path is stable if the path penalty value is below a determined threshold; and;
determine a path is unstable if the path penalty value is above the determined threshold; and
select the path for transmission based on the state information and the stability information.

* * * * *